United States Patent
Wang et al.

(10) Patent No.: US 8,879,918 B1
(45) Date of Patent: Nov. 4, 2014

(54) PLUGGABLE SMALL FORM FACTOR PLATFORM FOR OPTICAL PASSIVE DEVICES

(71) Applicant: Alliance Fiber Optic Products, Inc., Sunnyvale, CA (US)

(72) Inventors: Xinzhong Wang, Fremont, CA (US); Andy Zhou, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 137 days.

(21) Appl. No.: 13/831,839

(22) Filed: Mar. 15, 2013

Related U.S. Application Data

(60) Provisional application No. 61/685,976, filed on Mar. 29, 2012.

(51) Int. Cl.
*H04B 10/00* (2013.01)
*H04B 10/40* (2013.01)

(52) U.S. Cl.
CPC .................................. *H04B 10/40* (2013.01)
USPC ............ 398/135; 398/128; 398/138; 398/164

(58) Field of Classification Search
USPC .................... 398/128, 135, 138, 164
See application file for complete search history.

(56) References Cited

U.S. PATENT DOCUMENTS

| | | | | |
|---|---|---|---|---|
| 8,538,229 | B1* | 9/2013 | Wang et al. | 385/140 |
| 2008/0298815 | A1* | 12/2008 | Khalouf et al. | 398/202 |
| 2011/0221601 | A1* | 9/2011 | Aguren | 340/653 |
| 2013/0205069 | A1* | 8/2013 | Delfatti et al. | 711/103 |
| 2013/0343764 | A1* | 12/2013 | Coffey et al. | 398/135 |

* cited by examiner

*Primary Examiner* — Dalzid Singh
(74) *Attorney, Agent, or Firm* — Wuxi Sino IPs Agency, Ltd.; Joe Zheng

(57) ABSTRACT

A pluggable platform in small form factor is described. In one embodiment, the pluggable platform is designed to accommodate passive optical devices and may retrofit into an existing system. Further, the pluggable platform in small form factor is provided with an interface for tractability of the passive optical devices being supported.

13 Claims, 8 Drawing Sheets

For passive Devices

PLUGGABLE SMALL FORM FACTOR PLATFORM FOR OPTICAL PASSIVE DEVICES

CROSS-REFERENCE TO RELATED APPLICATION

This application claims the benefits of U.S. Provisional Application No. 61/685,976, filed Mar. 29, 2012, and entitled "Pluggable small form factor platform passive optical devices", which is hereby incorporated by reference for all purposes.

BACKGROUND OF THE INVENTION

1. Field of the Invention

The invention is generally related to the area of optical communications. In particular, the invention is related to a pluggable platform in small form factor to accommodate passive optical devices to retrofit into an existing system, where the pluggable platform in small form factor is provided with an interface for tractability and controllability of the passive optical devices.

2. The Background of Related Art

To meet the ever-increasing demands for high bandwidth and more flexibility in modern communication networks, utilizing optical fiber networks capable of transmitting multiplexed channel signals are becoming increasingly popular. Many optical devices have been designed to meet the demands. Among the optical devices, pluggable optical units are key elements in many applications of optical fiber communications. A cost-effective and reliable optical pluggable unit having low insertion loss and versatile function with flexibility is often required. FIG. 1 duplicates FIG. 1 of U.S. Pat. No. D467,544 to show a small form-factor pluggable optical transceiver module.

In terms of functionality, most of small form factor pluggable optical modules are active devices (e.g., transceivers) with high speed electrical interface. They increase the flexibility of a network and are being widely deployed in networks. Usually they are mounted on a 19-inch rack mount as shown in FIG. 2.

As in the real system, not only transceivers but also many other passive components (optical attenuator, isolator, filter, etc.) are required. These passive devices used to be installed in fixed positions inside an enclosure. Once they are deployed, they are difficult to be traced in an enclosure because they have no electronic interfaces linked with a system, thus very inflexible. On the other hand, there are many slots in a 19-inch rack mount, these slots are often not fully occupied. They may be the perfect positions for the many passive devices. FIG. 3 shows a typical application diagram with 10 transceiver slots, slots number 4 to 8 and 10 are not used. After the system is already installed, some optical transceivers need a filter at the receiving port or an isolator (or attenuator) at the transmitter port, hence one or more passive devices may be deployed to occupy the slots 5 and 7 without touching the inside of other chassis on the rack mount.

Ideally, such passive devices shall be coming in a pluggable platform or in a chassis retrofitting or pluggable to an existing system. Pluggable devices are widely available in electronic forms these days. A device that belongs to the pluggable category typically needs to be turned on and functioning as soon as it is inserted into an existing system or device. When it is unplugged from such a receptacle, neither the system that hosts the pluggable device nor the pluggable device itself would be damaged. Pluggable devices may be added or removed from a system without interrupting the synchronization between the devices and the system. Therefore, it is not required to have a power reset when replacing or upgrading such devices. Pluggable devices add on a good deal of system application upgrade flexibilities and are becoming more and more popular for electronics.

This invention disclosure intends to introduce a standalone pluggable device to host passive components. In one embodiment, the device is designed as a form factor of optical transceiver, including optical interconnection, interface electronics and housing case. The interface electronics shall be simplified because no high speed circuit is needed. In one embodiment, there may be a simple EEPROM integrated circuit for electronic tag function (storing some device information), and an on-line pin indicating the presence of the device to a system.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, a pluggable platform in small form factor is described. According to one aspect of the present invention, the pluggable platform is designed to accommodate passive optical devices and may be retrofittable in an existing system. Further, the pluggable platform in small form factor is provided with an interface for tractability of the passive optical devices being supported. Depending on implementation, the interface may be designed in accordance with a standard interface commonly used in a mountable platform for housing active optical devices. In another aspect, the interface may be expanded with additional functions to be able to trace or control the passive optical devices.

The present invention may be implemented as a method, an apparatus or a part of a system. According to one embodiment, the present invention is a platform for optical devices, the platform comprising: a passive optical device; and an interface including an integrated circuit for tracing the passive optical device and an on-line pin for detecting a presence of the platform to a system. In one embodiment, the platform is made rack mountable. The integrated circuit is an Electrically Erasable Programmable (EEPROM) or other memory inside other digital ICs for storing some device information of the passive optical device and electronic tag function. In another embodiment, the interface includes a RFID chip bonded with the passive optical device through a wireless interface.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 4-10. However, those skilled in the art will readily appreciate that the detailed description given herein with respect to these figures is for explanatory purposes as the invention extends beyond these limited embodiments.

Figure 1:
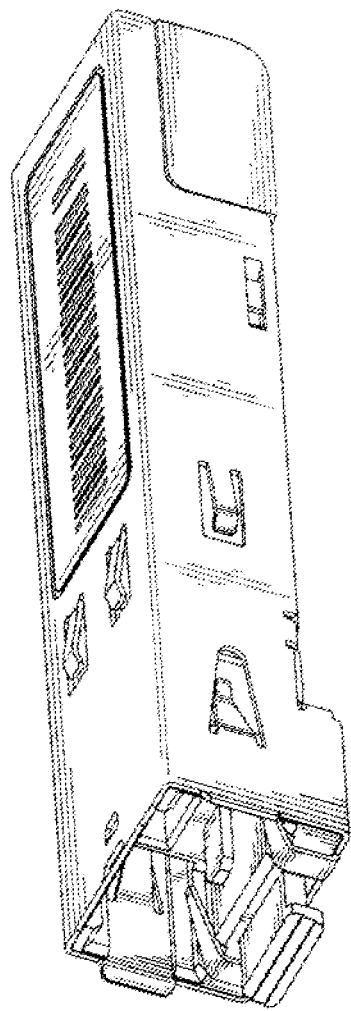
FIG. 1 duplicates FIG. 1 of U.S. Pat. No. D467,544 to show a small form-factor pluggable optical transceiver module.
Figure 2:
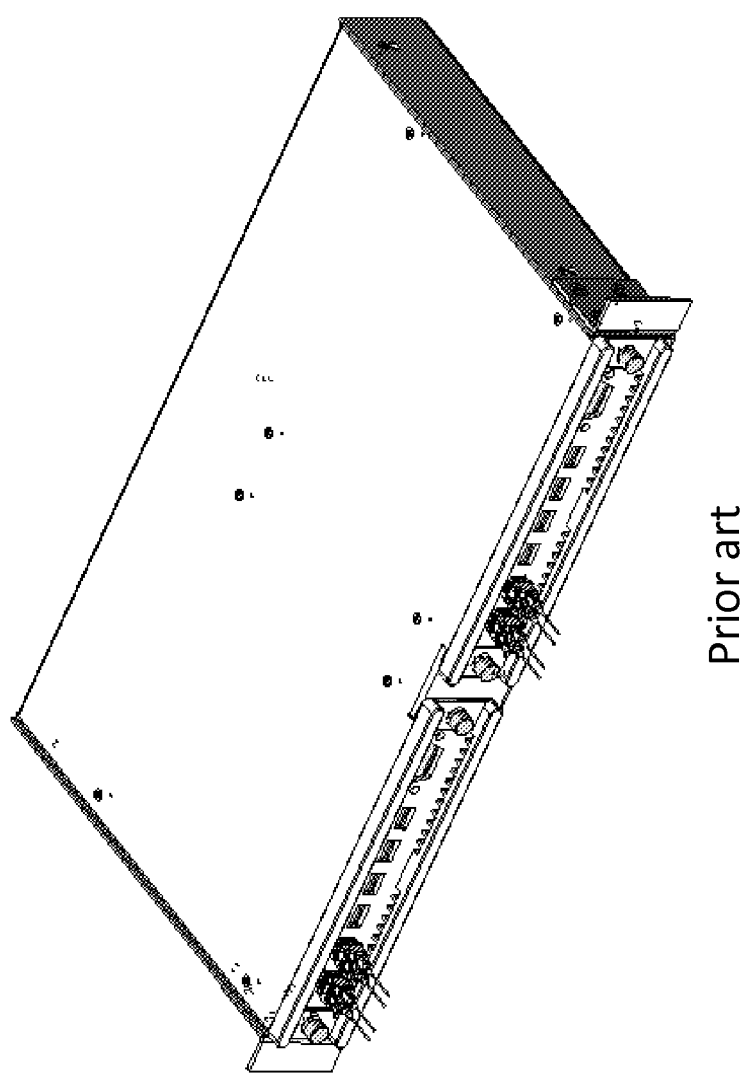
FIG. 2 shows an example of a 19-inch rack mount module that may be used in one embodiment of the present invention.
Figure 3:
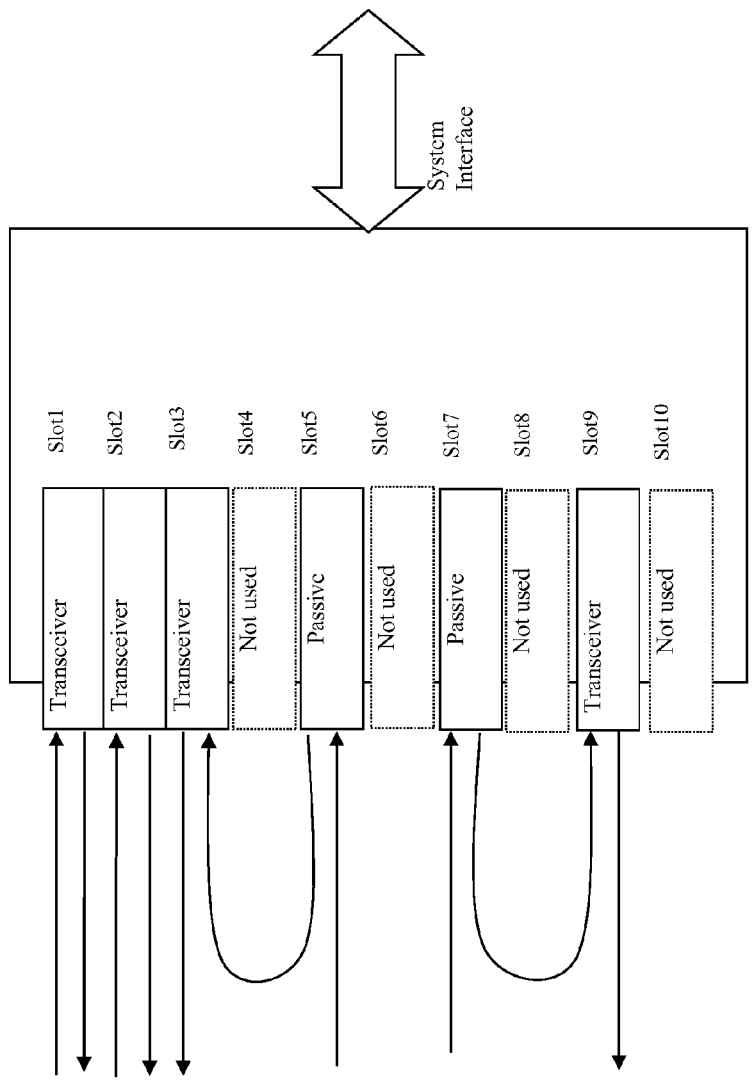
FIG. 3 shows a typical application diagram 10 transceiver slots, slots number 4 to 8 and 10 are not used, where the un-used slots may be used for one embodiment of the present invention.
Figure 4:
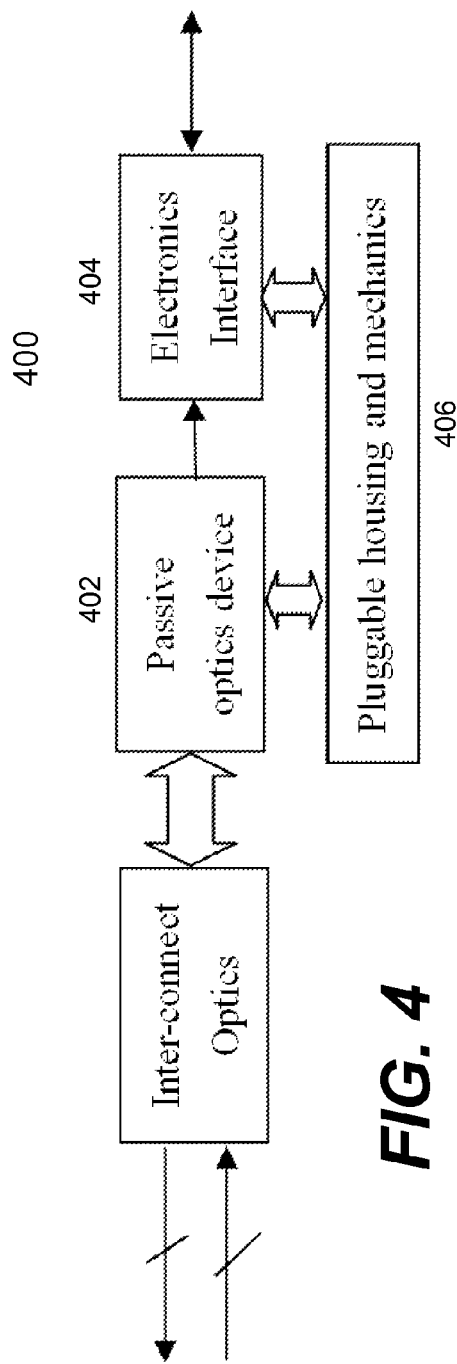
FIG. 4 shows a function diagram of a platform packaging one or more pluggable optical passive devices according to one embodiment of the present invention.

Referring now to the drawings, in which like numerals refer to like parts throughout the several views. FIG. 4 shows a function diagram of a pluggable device 400 according to one embodiment of the present invention. The device 400 includes a passive optical device 402 and a corresponding electronics interface 404, both are enclosed in a housing 406 that may be retrofittable or pluggable in an existing system. In general, an active optical device or component involves electric to optical conversations or vice versa. An example of the active optical device includes photo diode, MEMS, opto-mechanical, laser, and optical transceiver. Although a passive optical device may be any optical devices without the conversation, various benefits or advantages in an embodiment of the present invention would be fully realized if one component of the passive optical device 402 is electronically controlled. An example of such passive optical devices includes a multiplexier/demultiplexier or add/drop device with one or more controllable prisms or a variable optical attenuator with controllable attenuations.

Figure 5:
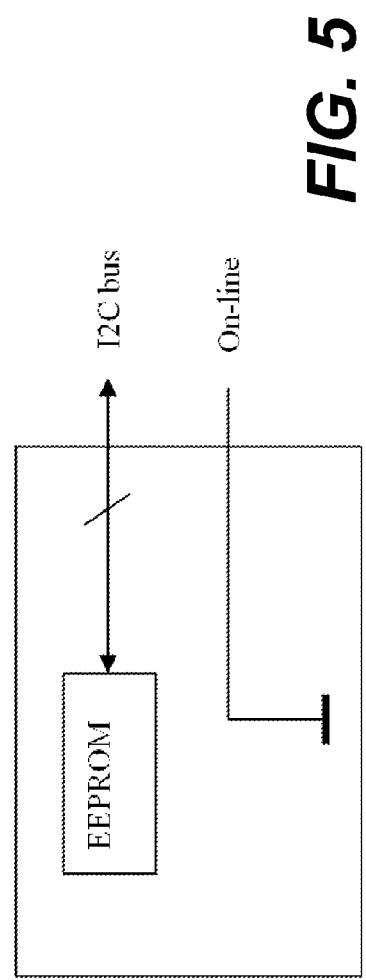
FIG. 5 shows one embodiment of using an EEPROM IC for electronic tag function (for storing some device information) and an on-line pin indicating the presence of the passive optical device, where the EEPROM IC may also be replaced by a micro-controller with non-volatile memory inside, in which case, it can generate an output signal to control the passive optical devices with tunable electrical interface like switches, tunable filters and polarization controllers.

The electronics interface 404 is provided to control or trace the passive optical device 402 or detect the presence of the passive optical device 402 in a system. According to one embodiment, an EEPROM IC (Electrically Erasable Programmable Memory Integrated Circuit) or a MCU (micro control unit) with none volatile memory for electronic tag function (for storing some device information) and an on-line pin indicating the presence of the passive optical device 402 are used as shown in FIG. 5. The EEPROM IC is designed to employ an I2C control to control one or more components in the passive optical device 402, if needed. One of the key elements herein is to allow the passive optical device traceable through a simple and low cost electronic interface, compatible or non-compatible with an existing interface designed for an optical transceiver (e.g., a sub-set interface including the hardware pin layout and e-tag data arrangement in the EEPROM).

Figure 6:
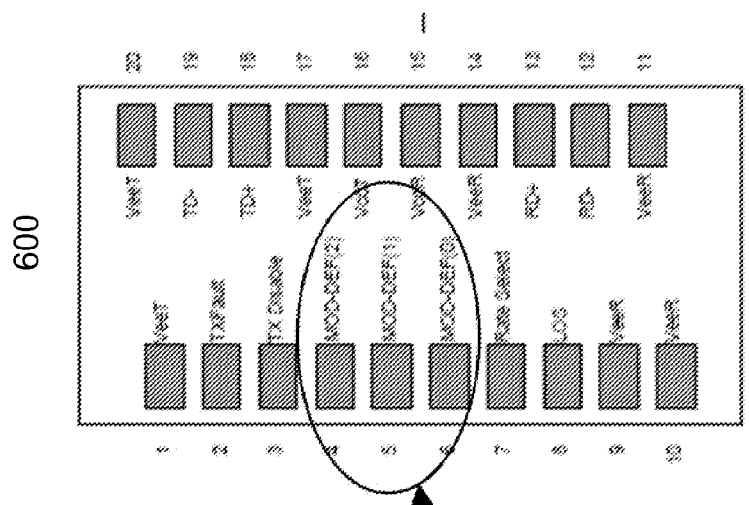
FIG. 6 shows an exemplary electronic interface that uses a sub-set of interfaces originally designed in an active device, only five pins are needed: Vee, Vcc, MOD-DEF(0) (on line), MOD-DEF(1) and MOD-FEF(2) (I2C bus) to facilitate the operation of an interface for the optical passive devices while the interface is originally designed for an optical transceiver.

According to one embodiment, the implementation of the traceability may not need a PCB physically connected to the system, it can be a RFID chip bonded with the passive component through a wireless interface. FIG. 6 shows an exemplary electronic interface 600 that uses a sub-set of interfaces originally designed in an active device, only five pins are needed: Vee, Vcc, MOD-DEF(0) (on line), MOD-DEF(1) and MOD-FEF(2) (I2C bus) to facilitate the operation of the interface while the interface 600 is originally designed for an optical transceiver.

It should be noted that the electronic interface is not limited to the small form-factor pluggable (SFP), it may be XFP, QSFP, CFP, CFP2, CFP4, and proprietary circuitry that can implement the functions of e-tag or device presence detection. As described above, when the interface is a RF ID chip without direct connection to a system, there is no physical PCB. The RFID chip is packaged directly with the passive component, bringing the advantage of non-contact tracing.

Figure 7:
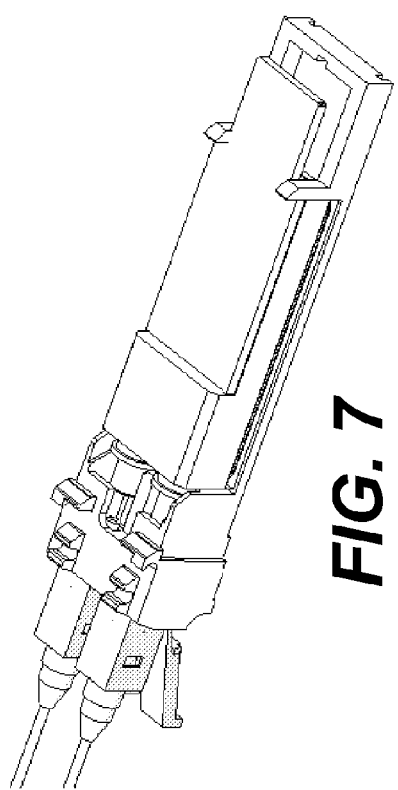
FIG. 7 and FIG. 8, respectively, show a passive component that could be a section of attenuated fiber for fixed optical attenuator (FVOA), an isolator, an optical switch, or a variable optical attenuator.
Figure 8:
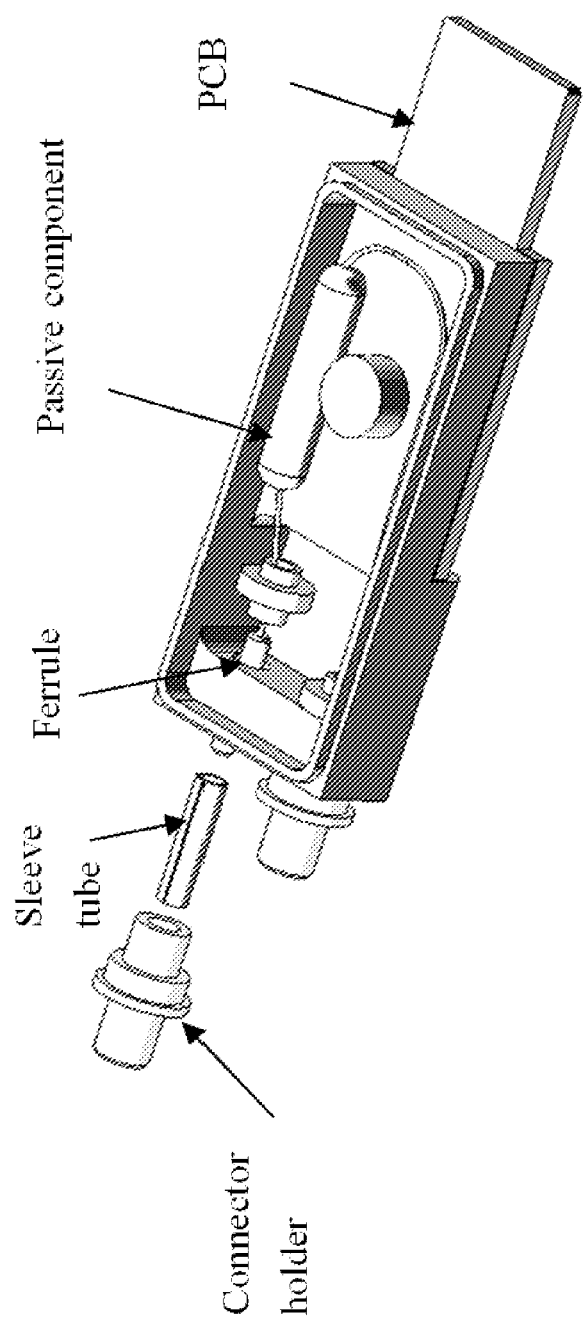
Figure 9:
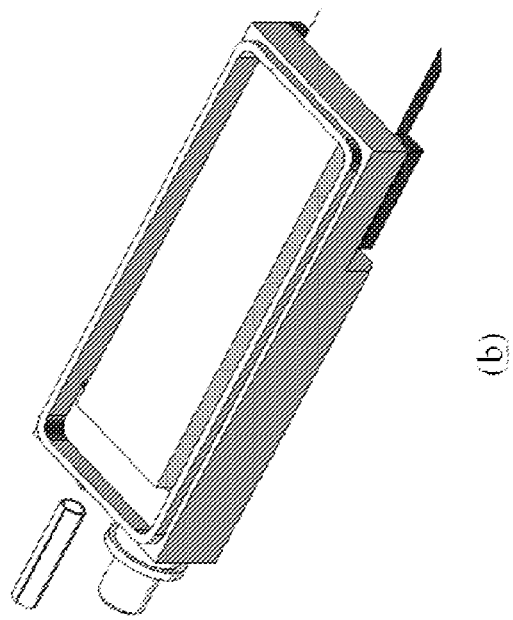
FIG. 9(a) and FIG. 9(b) show, respectively, a passive optical device that can be a single end unit or a device directly coupled with an inter-connection portion.
Figure 9:
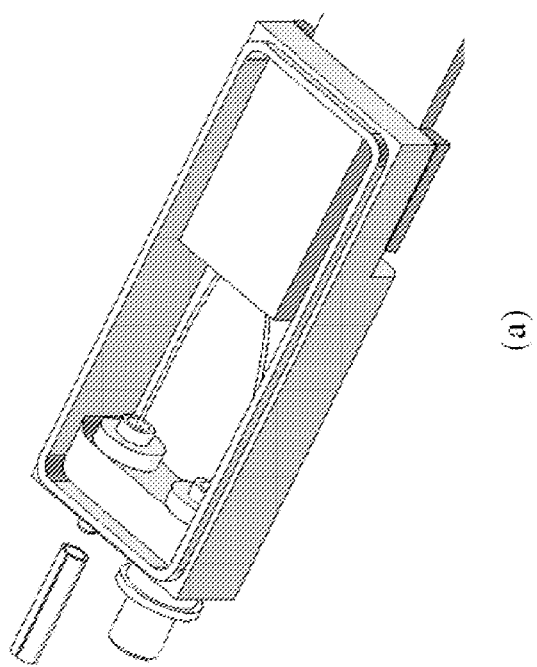

For some of the main functions of the pluggable passive optical module, there are connector holders, sleeve tubes, a housing case and one or more passive optical devices. One of the examples is shown in FIG. 7 and FIG. 8, respectively, in which a passive component could be a section of attenuated fiber for fixed optical attenuator (FVOA), an isolator, an optical switch, or a variable optical attenuator. The passive optical device can also be a single end unit as shown in FIG. 9(a) or a device directly coupled with an inter-connection portion as shown in FIG. 9(b).

In summary, a stand-alone small form factor platform with passive device can fulfill some pluggable functionality with two or more optical ports which are made equivalently to appear as an active pluggable active device (e.g., optical transceiver). The importance of such a pluggable package with a simple electronic interface is to provide the flexibility of easy deployment. Once deployed, the packaging provides easy upgrading, low maintenance and easy replacement. The tracing ability, adjustability and selectivity which a standalone passive optical component usually do not have is an additional feature provided in such a pluggable small form factor platform for optical passive devices. According to one embodiment, a small form factor package can be well utilized in one or more spare plug-in slots in an existing rack module or enclosure. In actual deployment, technicians would not need to disassemble an existing installed network or occupy much space to achieve the upgrade, or maintenance, the device electronic interface has the electronic ID circuit for the tracing in the system.

Figure 10:
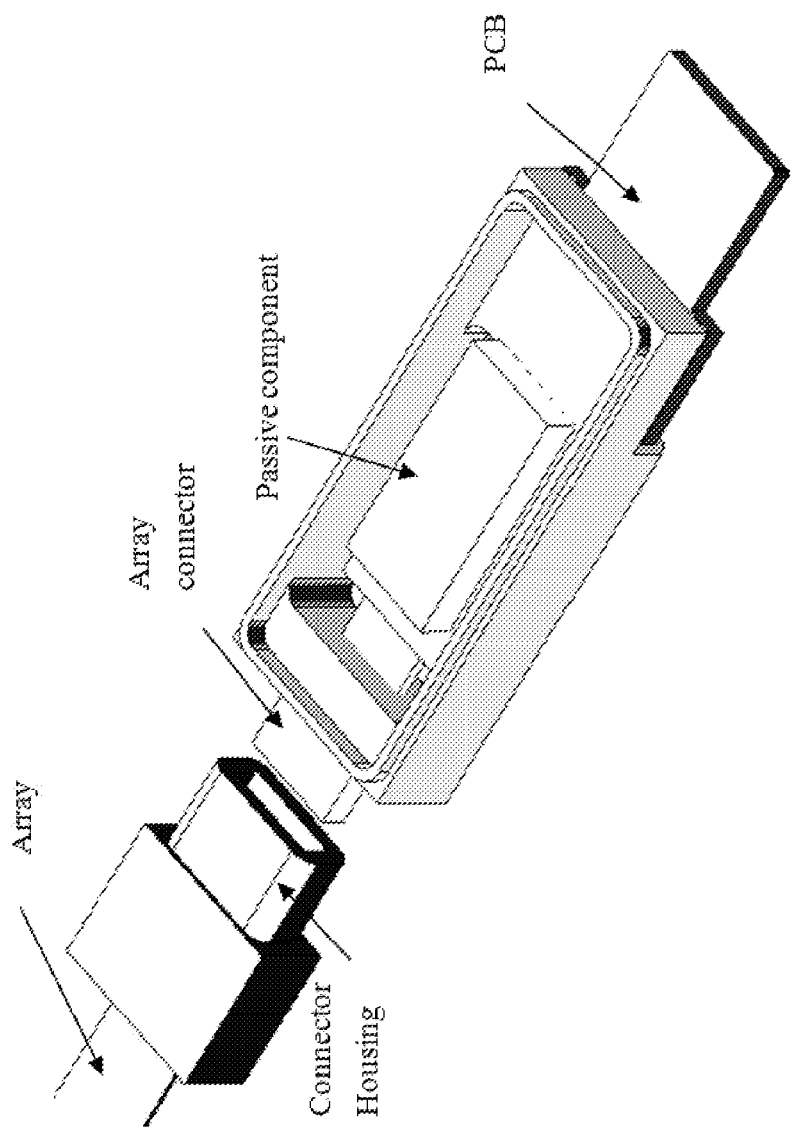
FIG. 10 shows as an example an array pluggable connector such as MPO.

It shall be noted the description of the present invention herein shall not be limited to a two-port passive device, and in fact may be expanded to any passive optical devices including WDM filter, 1XN or NXN optical switch, optical attenuator fixed or adjustable, optical isolator, polarization control and others. The pluggable optical interface is not limited individual connectors, such as LC, FC. It can also be an array pluggable connector such as MPO as shown in FIG. 10, and any fiber types including single-mode or multi-mode.

One of the key elements in the present invention is to let the passive optical device traceable through a simple, low cost electronic interface, compatible or non-compatible with an existing interface designed for the optical transceiver (a subset interface including the hardware pin layout and e-tag data arrangement in the EEPROM or in the none-volatile memory in a micro controller), in the case of using micro controller or other ICs, the passive optical device can be adjustable and selectable through same interface. The implementation of the traceability/control-ability may not need a PCB physically connected with a system, it can be a RFID chip bonded with the passive component through a wireless interface.

As summary, the present invention describes a small form factor platform which includes one or more pluggable optical interfaces and simple electronic interfaces for the functions of e-tag and control for the passive optical device therein and the presence detection by the system via a software module. The standard form-factor pluggable interface which may be made similarly to what an optical transceiver uses, making the system maintenance and upgrade much easier than the traditional fixed installation for passive optical device(s). These designs are also proved to be robust in reliability and repeatability with efficient cost.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. A platform for optical devices, the platform comprising:
   a passive optical device; and
   an interface including an integrated circuit for tracing and controlling the passive optical device and an on-line pin for detecting a presence of the platform to a system.

2. The platform as recited in claim 1, wherein the platform is made rack mountable.

3. The platform as recited in claim 2, wherein the passive optical devices is one of one or more of WDM filters, 1XN or NXN optical switches, fixed or manual adjustable optical attenuators, optical isolators, polarization controls, tunable filters.

4. The platform as recited in claim 3, wherein the optical passive device uses a pluggable optical interface.

5. The platform as recited in claim 4, wherein the pluggable optical interface is designed to take a form including LC and FC.

6. The platform as recited in claim 4, wherein the pluggable optical interface is designed to take a form of an array pluggable connector.

7. The platform as recited in claim 6, wherein fiber types used in the platform includes single-mode or multi-mode.

8. The platform as recited in claim 1, wherein the integrated circuit is an Electrically Erasable Programmable Memory (EEPROM) or no volatile memory in a micro control unit (MCU) for storing some device information of the passive optical device and electronic tag function.

9. The platform as recited in claim 1, wherein the integrated circuit is a micro control unit (MCU) for controlling, selecting characteristics and performances of the passive optical devices that are designed to be adjustable.

10. The platform as recited in claim 1, wherein the interface includes a RFID chip or other ICs bonded with the passive optical device through a wireless interface.

11. The platform as recited in claim 10, wherein the interface is designed to use a subset of a default interface originally designed in an active device.

12. The platform as recited in claim 11, wherein only five pins of the default interface originally designed in the active device are used: Vee, Vcc, MOD-DEF(0) (on line), MOD-DEF(1) and MOD-FEF(2) (I2C bus), to facilitate operations of the interface.

13. The platform as recited in claim 10, wherein the RFID chip is bonded with the passive optical device through a wireless interface.

* * * * *